Feb. 15, 1966 W. K. LOCKHART 3,235,863
COVER GLASS FOR LIGHT SIGNALS
Filed June 27, 1963 4 Sheets-Sheet 1
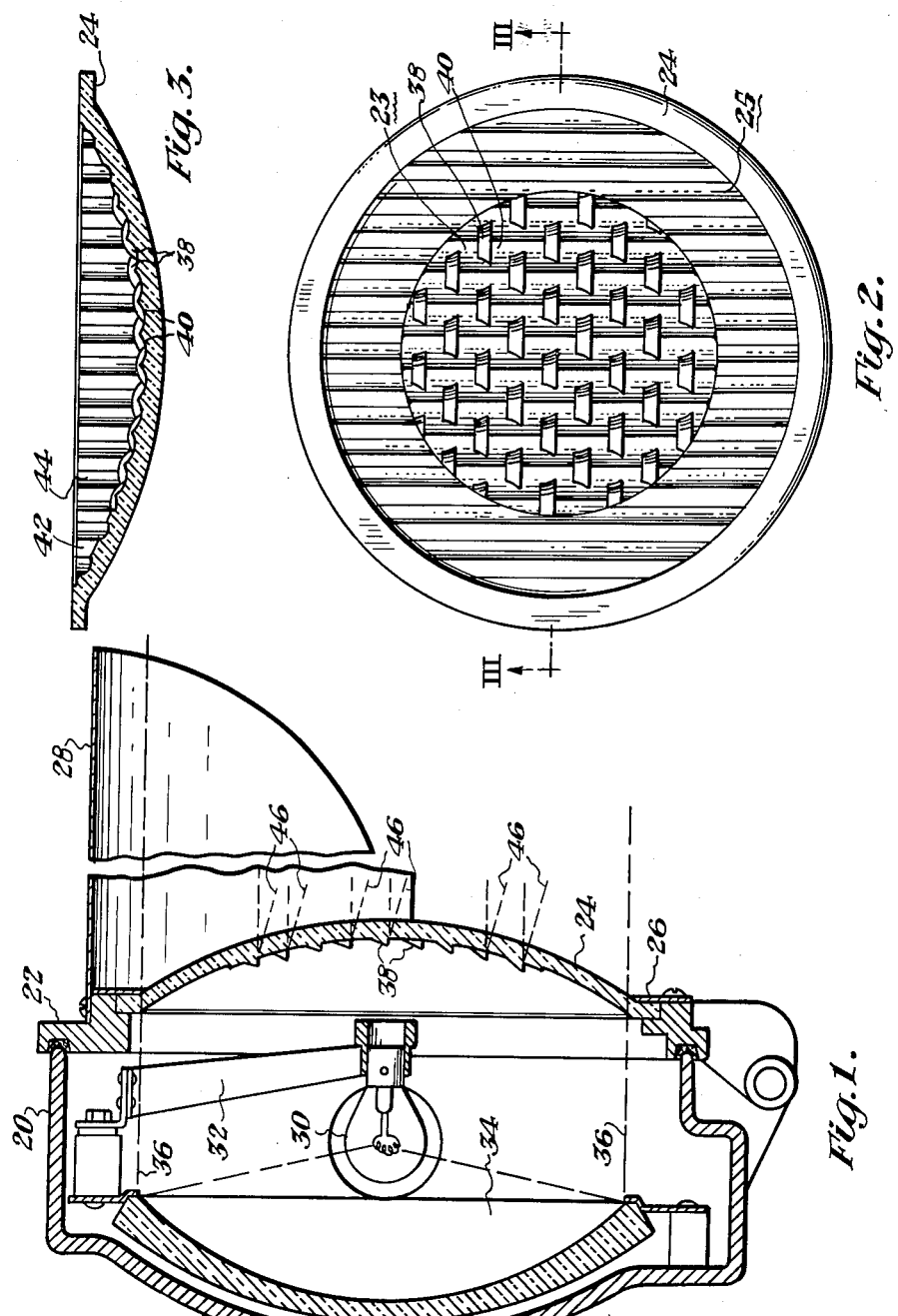
INVENTOR.
William K. Lockhart
BY
W. L. Stout
HIS ATTORNEY Feb. 15, 1966   W. K. LOCKHART   3,235,863
COVER GLASS FOR LIGHT SIGNALS
Filed June 27, 1963   4 Sheets-Sheet 3

INVENTOR.
William K. Lockhart
BY
W. L. Stout
HIS ATTORNEY

United States Patent Office 3,235,863
Patented Feb. 15, 1966

3,235,863
COVER GLASS FOR LIGHT SIGNALS
William K. Lockhart, Penn Hills Township, Allegheny County, Pa., assignor to Westinghouse Air Brake Company, Swissvale Pa., a corporation of Pennsylvania
Filed June 27, 1963, Ser. No. 291,048
7 Claims. (Cl. 340—383)

My invention relates to lenses for light signals and more particularly to lenses for a railroad grade crossing signal installation.

With the advent of higher speeds in automobile travel, it has become increasingly important, from the safety standpoint, to insure that drivers of these vehicles receive warning of impending danger in sufficient time to take the proper precautionary measures.

Traffic conditions today have exceeded the limitations of the present day traffic and highway crossing signal indications, unless these indications are built up to necessary higher levels of light by applications of lamp wattages, in some cases exceeding 200 watts for street traffic signals. In railroad grade crossing signal installations, however, this cannot be done because of different requirements. In all grade crossing installations, the signal is normally lighted from A.C. where such is available, but in case of A.C. power failure, the flashing lights must be operated from a standby battery source. The cost of providing a standby power supply for signals using over 200 watts each would be prohibitive. For this reason, highway grade crossing signal installations made by the railroads must necessarily use only the most efficient lamp and reflector light sources with low wattage concentrated filament lamps in order to provide the necessary indication and keep within reasonable limits of wattage required in a standby storage battery source of power.

In addition, traffic and highway crossing signals are normally equipped with hoods to shield the cover and its displayed indication from direct sunlight. Hoods to be effective must necessarily be located reasonably close to the outside limits or edges of the lens displaying the indications. Any hood employed must necessarily have some appreciable length to be effective in keeping normal sunlight from the surface of the lens to prevent phantom indications due to sunlight or other bright light falling upon the signal cover. It follows that an effective hood such as described above may also block the view of a portion of the cover adjacent to the hood when viewed from a sufficiently large angle on either side of the optical axis of the signal.

Accordingly, it is an object of the present invention to provide a new and improved highway crossing light signal.

Another object of the invention is to provide a new and improved lens for a highway crossing light signal of the type described.

It is a further object of this invention to provide a new and improved lens for a highway crossing light signal to efficiently utilize the available light from the source.

It is a more particular object of this invention to provide a new and improved optical system for a highway crossing light signal to maximize the long range visibility while still providing for lateral and vertical dispersion with substantially no loss of effective light.

Briefly my invention accomplishes the aforementioned objects by employing a source of parallel light rays and a lens interposed between the source and a viewer. The lens is preferably hooded to shield it from the glare of the sun, and the lens configuration comprises an annular portion generally adjacent the hood and a central circular portion. The annular portion is provided on its inner surface with parallel vertically extending furrows or prisms spaced from each adjoining furrow or prism by a substantinally nonrefracting region, and permits the light rays to pass therethrough with a limited amount of spread in the horizontal plane and substantially no deflection in the vertical plane to thus provide high intensity long range visibility. The central circular portion is provided with vertically extending flutes or prisms to effect a greater degree of spread in the horizontal plane, and certain embodiments have prismatic configurations superimposed on the flutes to deflect the light downwardly the desired angle.

Other objects, features and advantages of my invention will become apparent as the description proceeds, in conjunction with the accompanying drawings wherein:

FIG. 1 is a vertical longitudinal sectional view showing a light signal embodying my invention;

FIG. 2 is a rear elevational view of the lens employed in the light signal of FIG. 1;

FIG. 3 is a sectional view of the lens of FIG. 2 taken along line III—III thereof;

Figure 4:
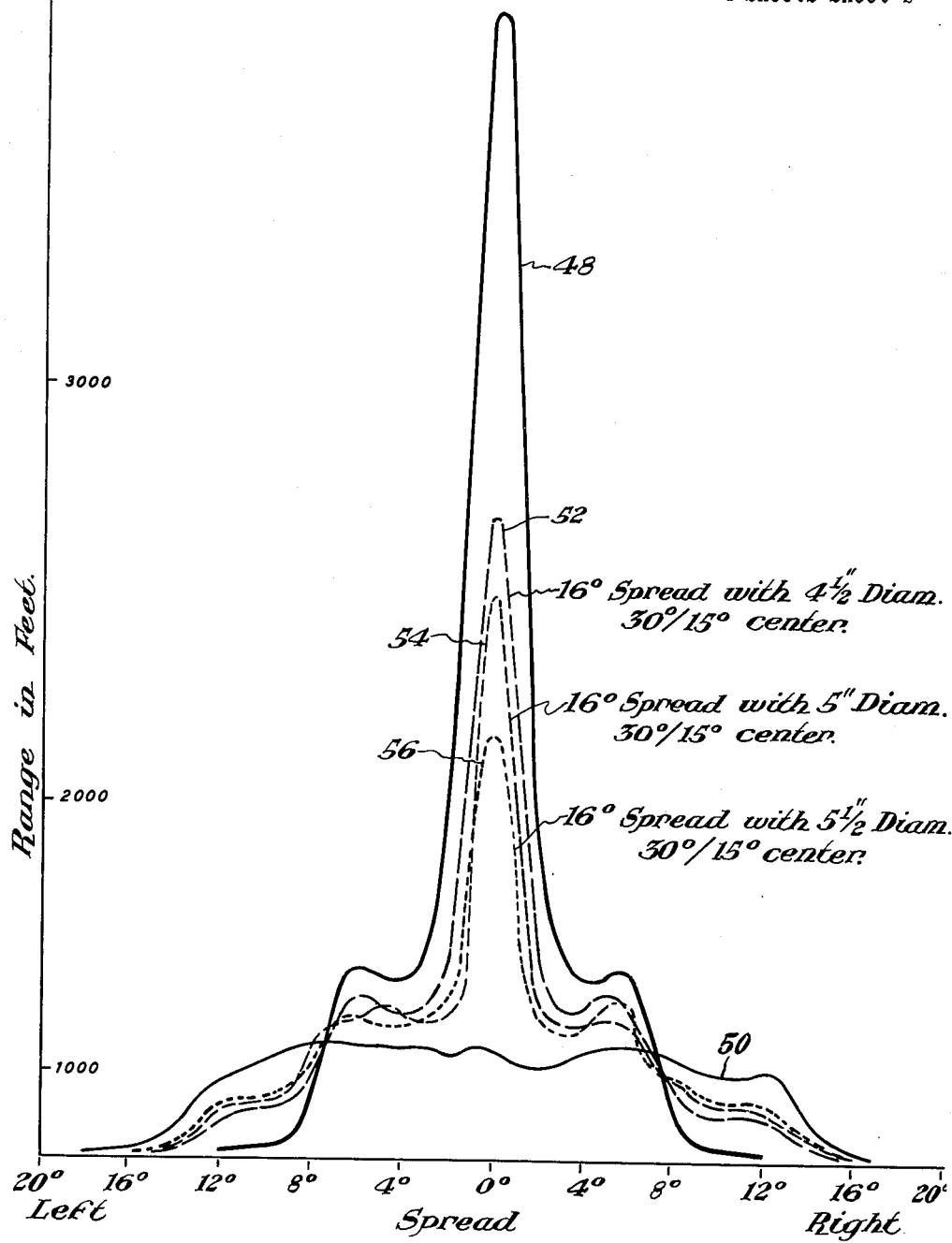
FIG. 4 is a range-spread curve for the individual prismatic lens configurations of the lens of FIG. 2 and the composites thereof.

Referring first to FIG. 1, the signal comprises a housing 20 which is generally cup-shaped with the opening having a closure assembly hingeably attached thereto. The closure assembly includes a ring 22 and a lens 24 secured thereto by suitable fastening means such as the clamp 26. A hood member 28 (only a portion of which is shown) is secured to the closure assembly ring 22 and extends generally in the direction of travel of the main beam of light. The hood member 28 is arcuate in form and to be effective encircles more than one-half of the periphery of the closure to exclude sunlight or other bright light from striking the outer face of the lens 24 and thereby prevent "reflex indications."

A lamp 30 is supported by a suitable bracket 32 secured to the housing 20, and is generally positioned at the focal point of a parabolic reflector 34 so that light rays therefrom are projected in a main beam of substantially parallel rays indicated by the broken lines 36—36.

As shown in FIGS. 1, 2 and 3, the lens 24 is dished with concentric convex outer and concave inner surfaces, the outer convex surface of which is generally smooth. As can be seen in FIG. 2, the inner concave surface of the lens 24 includes a central circular portion 23 and an annular portion 25 adjacent the periphery of the lens 24. The circular portion 23 has formed thereon rows of vertical flutes 40, having superimposed thereon staggered horizontal rows of prisms 38 which are generally frustroconical in shape. The annular portion 25 is provided with a plurality of parallel vertically extending concave furrows 44, spaced from each adjoining furrow 44 by a substantially nonrefracting region 42. The furrows 44 are shown as arcuate in cross-section but may have other cross-sections depending on the amount of spread desired from the annular portion 25.

The flutes 40 on the central circular portion 23 are concave and the radius of the arc thereof is less than that of the furrows to give a greater degree of light dispersion, while the prisms 38 are formed at an angle to give the desired downward deflection as illustrated by the lines 46 in FIG. 1. In the outer annular portion 25, the ribs 42 permit the light to pass through substantially unrefracted while the furrows 44 provide a small amount of lateral dispersion.

Thus it becomes apparent that the lens 24, when used in a highway crossing light signal, will efficiently utilize the available light from the source. The annular portion 25 will produce the long-range indication more efficiently because none of the output is lost against the hood 28 as is the case when wide-angle indications are produced in the area adjacent the hood 28. Some limited horizontal deflection may be applied before interference by the hood 28 is encountered. Also, the larger physical size of the annular portion 25 is much better for viewing at a distance than the smaller central circular portion 23. Consequently, all of the light from the lamp and reflector combination that falls upon the long range annular portion 25 is utilized entirely to produce a beam having limited horizontal spread or deflection, if any, and none whatever for vertical deflection. This single control direction for the annular portion 25 materially improves the efficiency because more light is available per unit area of cover surface. Similarly, central circular portion 23, having a radius less than that of the radius of the arc of the hood 28, will encounter less interference from the hood 28 when viewed from the side angle, and thus will produce the necessary wide-angle horizontal spread or deflection effectively over its area.

FIG. 4 illustrates graphically the results of the utilization of the lens 24 in conjunction with a source of parallel light rays. The curves represent lenses having the same radius but differently arranged surface contours. The curve 48 illustrates the results obtained by the lens having its total inner surface formed similarly to that of the outer annular portion 25, with furrows 44 separated by nonrefracting regions 42, and showing an axis range of approximately 3800 feet utilizing a 10 volt, 18 watt lamp. As can be seen, the effectiveness of such a lens at less than 1500 feet is somewhat limited to a spread of plus or minus 8 degrees. The curve 50 represents a lens having its total inner surface formed substantially the same as the central circular portion 23. The lens of the curve 50, while having an effective spread of plus or minus 15 degrees, has its range limited to approximately 1100 feet. The composite curves 52, 54 and 56 show the optical results obtained with a 10 volt, 18 watt lamp in a signal employing the lens 24 of FIG. 2 with the circular portion 23 having different diameters. Thus it can be seen that while the lenses of the composite curves 52, 54 and 56, at plus or minus 15 degrees lose a small part of the available light of the lens of curve 50, it is still effective to approximately 800 feet, and the outer annular portion is effective to approximately 2700 feet in the case of curve 52. Consequently, the lens 24 results in a long range high intensity beam from the outer annular portion 25, and a close range light beam with a vertical deflection of 15 degrees, or whatever may be desired, from the inner circular portion 23. As a result thereof, an approaching vehicle receives adequate warning up to 2700 feet, and if the vehicle is closer to the signal the increased spread of the light will insure sufficient warning.

It is apparent that to obtain optimal results, the area of the circular portion 23 should be sufficient to provide the desired spread for close range indication, while the diameter should be sufficiently small to prevent noticeable interception by the hood. Similarly, the area of the annular portion 25 must be large enough to obtain the long range indication, and still be small enough so as not to interfere with the function of the central circular portion 23. When the area of the annular portion 25 is at least equal to or greater than the area of the circular portion 23, optimum efficiently is attained. Thus, with a generally uniform density of light rays from the source, the amount of light in the long range beam from the annular portion 25 will be at least equal to half the total light output of the source. It should be understood that the above parameters provide the optimum efficiency and that minor variations in these parameters are intended to fall within the purview of the invention described.

The lens 24 of FIG. 2 is constructed to provide a 30 degree spread, and a 15 degree downward deflection, but other angles of spread and deflection may be employed without departing from scope of the invention.

Figure 6:
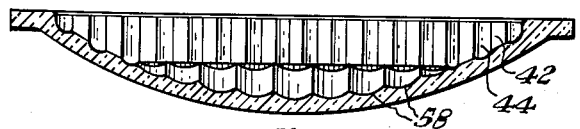
FIG. 6 is a sectional view of the lens of FIG. 5 taken along the line VI—VI thereof.
Figure 5:
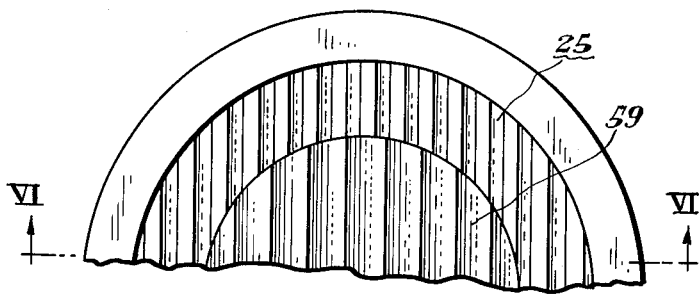
FIG. 5 is a fragmental rear elevational view of a modification of the lens of FIG. 2.
Figure 9:
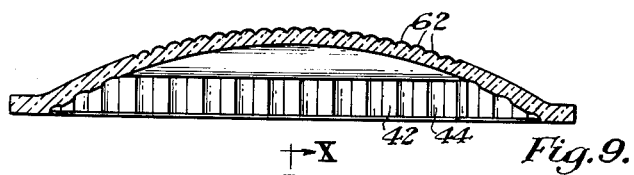
FIG. 9 is a sectional view of the lens of FIG. 8 taken along the line IX—IX thereof.
Figure 8:
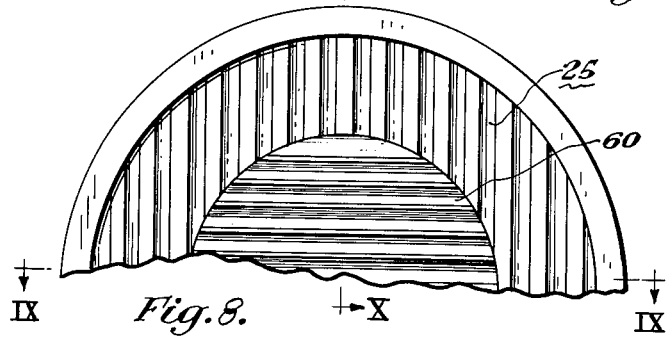
FIG. 8 is a fragmental rear elevational view of the lens of FIG. 7.
Figure 10:
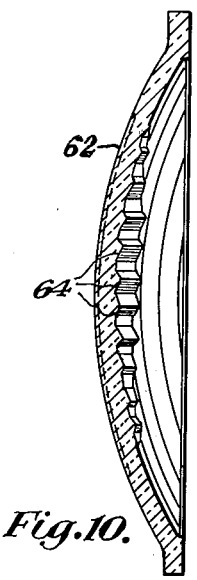
FIG. 10 is a complete sectional view of the lens of FIG. 8 taken along the line X—X thereof.
Figure 7:
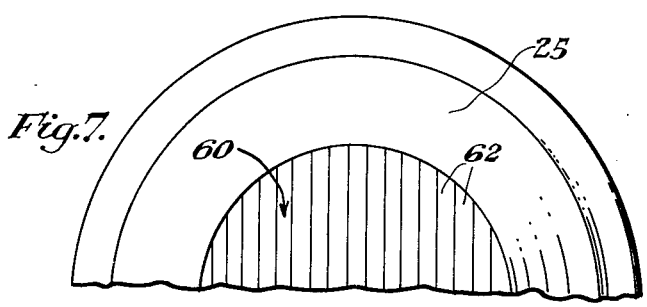
FIG. 7 is a fragmental front elevational view of another modification of the lens of FIG. 2.

An alternative lens configuration is illustrated in FIGS. 5 and 6 having the same annular configuration on the inner concave surface as that of the lens illustrated in FIG. 2, and the corresponding numbers will be used for that part thereof. The outer convex surface is smooth, and the inner surface of the central circular portion 59 is composed of vertical rows of concave flutes 58, the arc thereof being determinative of the degree of lateral spread. In the instant embodiment, the radius of the arc provides a 70 degree spread which is plus or minus 35 degrees from the optical axis of the light source. The annular portion 25 is identical to that described in the preceding paragraphs.

FIGS. 7 through 10 illustrate a second alternative embodiment utilizing the present invention. The general size and shape of the lens is similar to that of the lens 24 in FIG. 2 and the annular portion 25 is identical. The central circular portion 60, however, has vertical convex flutes 62 on the outer surface thereof, and parallel horizontally disposed refracting prisms 64 on the inner surface thereof. In this embodiment, it will be perferable to have the outer surface of the lens smooth, and if desired, the flutes 62 may be superimposed on the refracting prisms 64 on the inner surface of the lens to attain substantially the same result. Refracting prisms 64 and flutes 62 may also be applied to the concave surface in narrow alternating vertical bands of each type over the central circular area 60. As can be seen, the flutes 62 will distribute the light laterally while the refracting prisms 64 would provide the necessary downward deflection in the vertical plane. For purposes of illustration only the flutes 62 have not been shown on FIG. 8 in order that the prisms 64 be shown with clarity.

Figure 11:
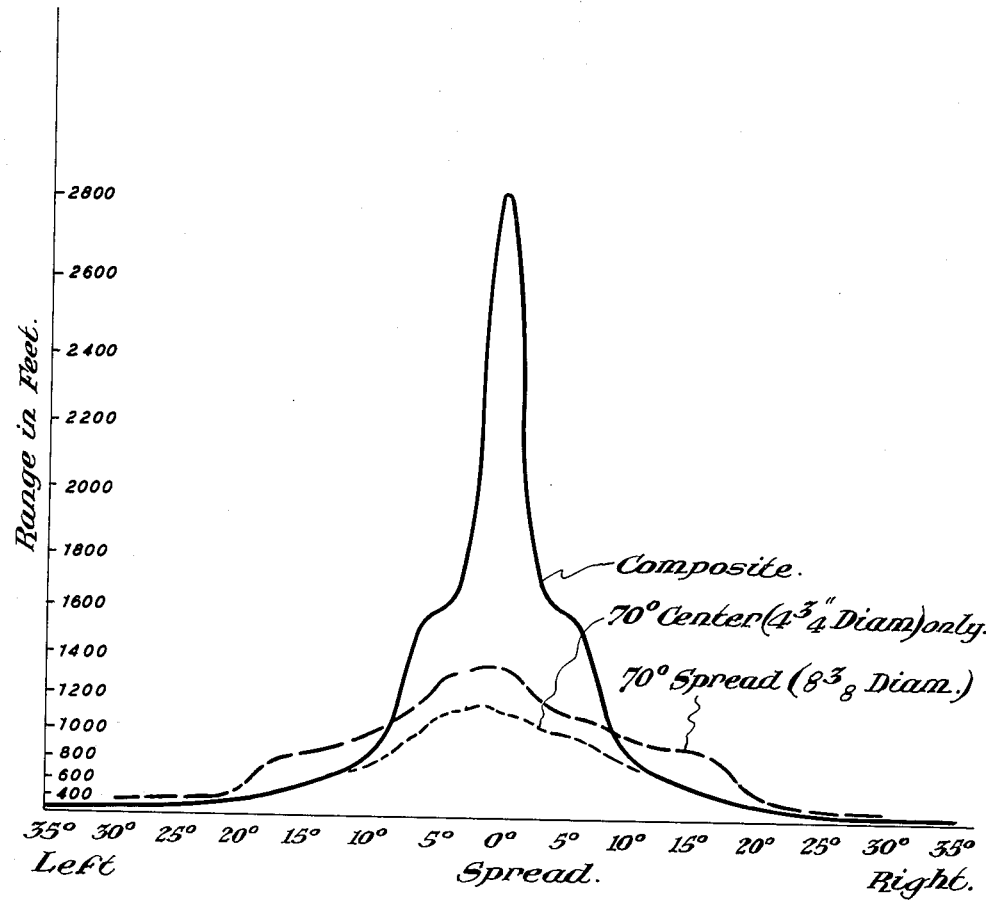
FIG. 11 is a range-spread curve for the individual prismatic configurations of the lens of FIG. 5 and the composites thereof.

The optical results achieved by a signal employing the lens of FIG. 5 are illustrated in FIG. 11. The curve 65 demonstrates the range-spread curve for a lens having the same diameter as that of FIG. 5, but with the vertical concave flutes 58 covering the entire inner surface. The curve 66 demonstrates the results of the central circular portion 59 only, of the lens as shown in FIG. 5, while the curve 68 shows the composite results thereof. The results achieved are comparable to those shown in FIG. 4.

Thus there have been shown and described several embodiments of lenses which, when used in conjunction with the signal described, provide maximum efficiency from low wattage light sources. The annular portion permits the parallel rays to pass through generally uninterrupted with virtually no absorption by the under surface of the hood to provide long range high intensity indication; while the central circular portion, being of smaller diameter, is so constructed as to provide the desired lateral and downward deflection with virtually no obscuring of the rays by the hood except at extremely close wide angle viewing ranges.

The directions referred to herein are intended to be illustrative only and in no way are intended to limit the invention. Other prismatic configurations can be applied to either the annular portion or the circular portion of the lens, as will appear obvious to one skilled in the art, without departing from the spirit and scope of the invention.

Although there has herein been shown and described a few embodiments of my invention, it is understood that changes and modifications may be made herein within the scope of the appended claims without departing from the spirit and scope of this invention.

Having thus described my invention, what I claim is:

1. A light signal comprising a source of light, means for projecting a beam of substantially parallel rays from said source, and a spherical lens interposed in said beam, said lens having an annular portion and a central circular portion, said annular portion being provided on the inner concave surface thereof with horizontally spaced parallel vertically extending furrows, said parallel light rays passing through said lens in said space between said furrows in a similar mode parallel to said parallel rays the central circular portion of said lens being provided with a plurality of vertically extending flutes to effect a lateral distribution of the rays of light, said annular portion and said circular portion having substantially equal areas, said annular portion providing minimum lateral spread for long range indication and said circular portion providing greater lateral spread for close range wide angle viewing.

2. A lens for a light signal having a source of generally parallel rays, said lens comprising a central circular portion and an annular portion, said annular portion and said circular portion having substantially equal areas, said annular portion being provided with horizontally spaced parallel regions which allow the passage of said parallel rays in a similar mode parallel to said parallel rays, each of said regions being spaced from each adjoining region by a light dispersive region for horizontally spreading the rays of light from said source through a predetermined angle, said circular portion being provided with a prismatic surface for effecting a greater degree of horizontal spreading of said light rays, whereby said annular portion provides high intensity long range indication and said circular portion provides closer range wide angle indication.

3. A lens for a light signal having a source of generally parallel rays, said lens having concentric convex outer and concave inner surfaces, said outer surface being generally smooth, said inner surface having a central circular portion and an annular portion, said annular portion being provided with horizontally spaced parallel vertically extending arcuate furrows, said parallel light rays passing through said lens in said space between said furrows in a similar mode parallel to said parallel rays, said circular portion being provided with a plurality of vertically extending flutes having a radius less than that of said furrows to effect greater lateral spread of rays of light passing through said circular portion, and prisms superimposed on the flutes of said circular portion to downwardly deflect rays of light passing therethrough.

4. A lens for a light signal having a source of generally parallel rays, said lens having concentric convex outer and concave inner surfaces, said outer surface being generally smooth, said inner surface having a central circular portion and an annular portion, said annular portion being provided with horizontally spaced parallel vertically extending arcuate furrows, said parallel light rays passing through said lens in said space between said furrows in a similar mode parallel to said parallel rays, said circular portion being provided with a plurality of vertically extending flutes having a radius less than that of said furrows to effect greater lateral spread of rays of light passing through said lens, and prisms superimposed on the flutes of said circular portion to downwardly deflect rays of light passing therethrough, said annular portion and said circular portion having substantially equal areas.

5. A lens for a light signal, having a source of generally parallel rays, said lens having concentric convex outer and concave inner surfaces, said lens having a central circular portion and a peripheral annular portion, the inner surface of said annular portion being provided with horizontally spaced parallel vertically extending furrows, said parallel light rays passing through said lens in said space between said furrows in a similar mode parallel to said parallel rays, said central circular portion being provided with a plurality of vertically extending flutes on at least one of said outer and inner surfaces, said flutes being so shaped to disperse light rays passing therethrough laterally through a greater angle than light rays passing through said annular portion, and horizontally disposed prisms formed on at least one of said inner and outer surfaces of said circular portion, said prisms being shaped to deflect light rays passing therethrough in a downward direction.

6. A lens for a light signal having a source of parallel rays therein, said lens having concentric convex outer and concave inner surfaces, said outer surface being generally smooth, said inner surface having a central circular portion and an annular portion, said annular portion being provided with horizontally spaced parallel vertically extending arcuate furrows, said parallel light rays passing through said lens in said space between said furrows in a similar mode parallel to said parallel rays, said circular portion being provided with a plurality of vertically extending flutes having a radius less than that of said furrows to effect greater lateral spread of rays of light passing through said circular portion, staggered rows of horizontally disposed frustro-conical prisms superimposed on said flutes to downwardly deflect rays of light passing therethrough, said annular portion providing minimum lateral spread of said parallel rays for long range indication and said circular portion providing greater lateral spread for close range wide angle viewing.

7. A lens for a light signal having a source of generally parallel rays, said lens having concentric convex outer and concave inner surfaces, said lens having a central circular portion and a peripheral annular portion, the inner surface of said annular portion being provided with horizontally spaced parallel vertically extending arcuate furrows, said parallel light rays passing through said lens in said space between said furrows in a similar mode parallel to said parallel rays, the inner surface of said central circular portion being provided with horizontally disposed downwardly light-deflecting prisms, and the outer surface of said circular portion being provided with a plurality of vertically extending convex flutes being so shaped to disperse light rays passing therethrough laterally through a greater angle than light rays passing through said annular portion.

References Cited by the Examiner

UNITED STATES PATENTS

| | | | |
|---|---|---|---|
| 1,870,247 | 8/1932 | Froget | 240—41.3 |
| 1,878,273 | 9/1932 | Fisher et al. | 240—41.3 X |
| 1,955,599 | 4/1934 | Lamblin-Parent | 240—41.3 |
| 2,068,805 | 1/1937 | Lebby | 340—383 |

NORTON ANSHER, *Primary Examiner.*